(No Model.)
C. K. WELCH.
WHEEL FOR VEHICLES.
No. 522,813. Patented July 10, 1894.
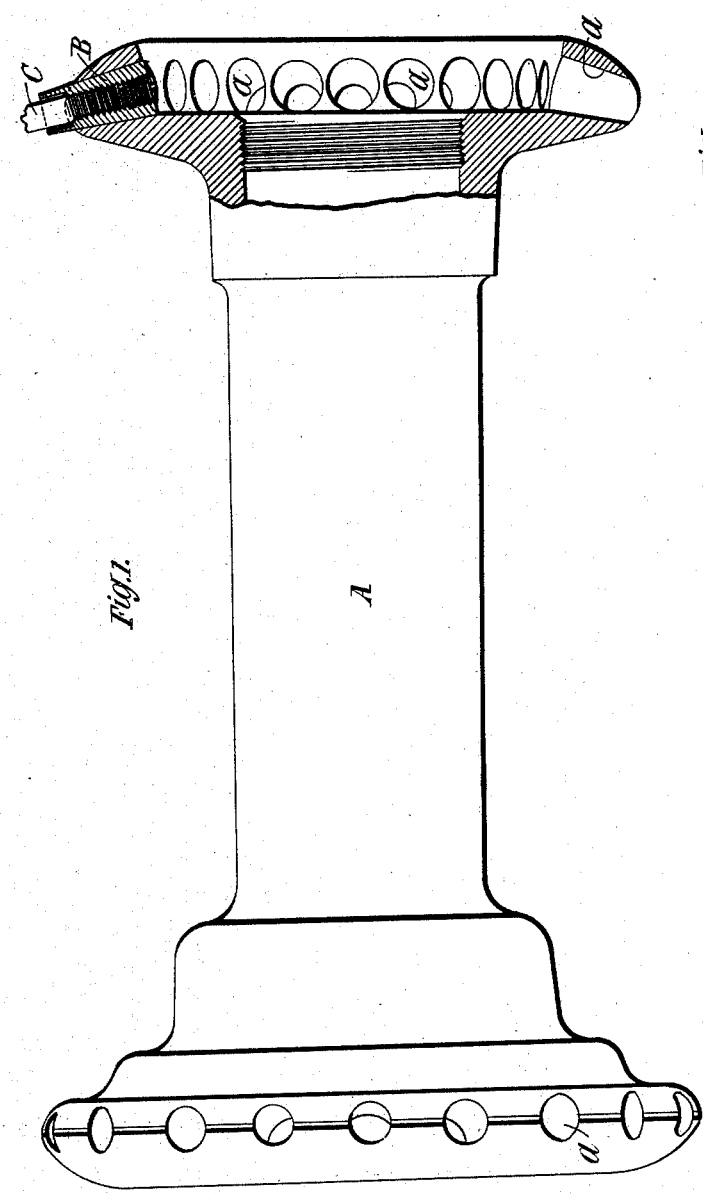
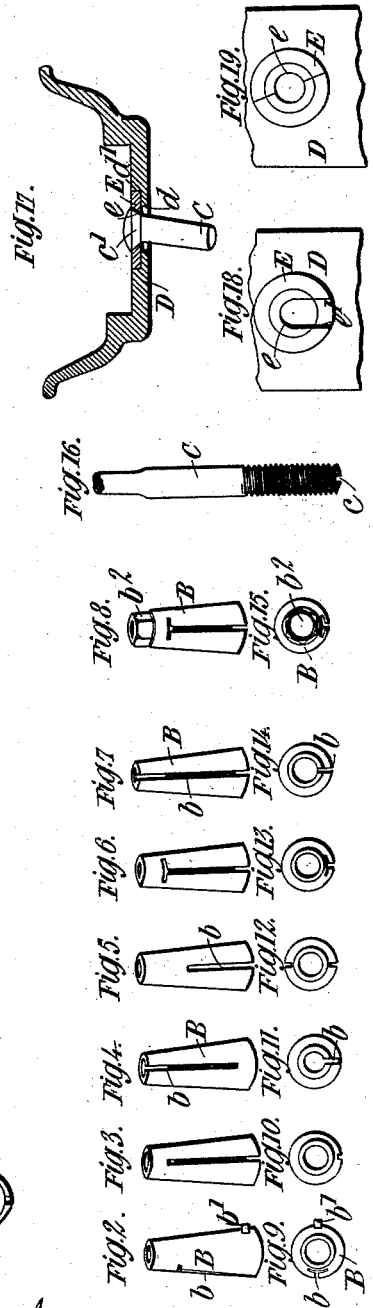

UNITED STATES PATENT OFFICE.

CHARLES KINGSTON WELCH, OF COVENTRY, ENGLAND, ASSIGNOR OF ONE-HALF TO HARVEY DU CROS, OF DALKEY, IRELAND.

WHEEL FOR VEHICLES.

SPECIFICATION forming part of Letters Patent No. 522,813, dated July 10, 1894.

Application filed January 24, 1894. Serial No. 497,863. (No model.) Patented in France December 6, 1893, No. 234,608.

*To all whom it may concern:*

Be it known that I, CHARLES KINGSTON WELCH, engineer, a subject of the Queen of Great Britain, and a resident of Coventry, England, have invented certain new and useful Improvements in Suspension or Tension Wheels for Vehicles, of which the following is a specification, reference being had to the accompanying drawings.

I have obtained a patent for this invention in France, No. 234,608, dated December 6, 1893.

This invention relates to suspension or tension wheels for vehicles and has for its object to provide improved means for securing the spokes in position between the hub and rim of such wheels.

According to one part of my invention I construct improved spoke-nipples which are coned externally and are split longitudinally in one or more places for a part or the whole of their length. Said nipples are adapted to fit holes preferably conical formed in the hub or rim of the wheel so that when the spokes are screwed into said nipples and the latter are thereby drawn into the holes in the hub or rim the nipples are tightened on the spokes, very securely holding the same. Moreover owing to the aforesaid slots in the nipples spokes are very easily screwed into or out of the said nipples.

In another part of my invention I provide for securing the spokes to the rim by means of a split washer or its equivalent adapted to fit a recess in the rim and having a coned opening in which the head of the spoke fits. The head of the spoke is easily put through the washer from the side of the rim nearest the hub but when screwed tight and pulled toward the hub the washer is brought by the head of the spoke to its bearing in the rim and is securely held in place.

In the accompanying drawings Figure 1 is a front view partly sectional of a hub adapted to have spokes secured thereto in accordance with my invention, one spoke being shown in position. Figs. 2 to 8 are front views showing different varieties of the nipples, and Figs. 9 to 15 are plan views of Figs. 2 to 8, respectively. Fig. 16 is a view showing the threaded end of the spoke. Fig. 17 is a sectional view of part of a rim having a spoke secured thereto according to my invention. Fig. 18 is a plan view of Fig. 17, and Fig. 19 is a view similar to Fig. 18 showing a modification of my invention.

A is the hub, B, one of the nipples and C the spokes. My improved nipple is conical in form as shown and is split or slotted longitudinally as shown at $b$. The said slot is preferably T-shaped but it may obviously be of any suitable form and I may provide the nipples with more than one slot if desired. The holes $a$ in the hub A for the nipples to bed in are conical so that when a spoke is screwed up and its nipple drawn outward, the said nipple is compressed and the slot $b$ therein is more or less closed together. The nipple is thereby caused to grip the spoke very tightly and hold it firmly in its place.

In Figs. 2 to 14 nipples are shown having slots of various forms.

In Figs. 2 and 9 the slot $b$ is T-shaped and extends only part of the length of the nipple, said nipple is moreover provided with a pin $b'$ which engages in a suitable recess in the side of the orifice $a$ in the hub to prevent the nipple rotating when in place therein. In most cases however the friction of the nipple in its recess is sufficient to prevent such rotation.

In Figs. 3 and 10 the slot $b$ is a straight slot extending from the bottom to nearly the top of the nipple, in Figs. 4 and 11 the slot is also straight but extends from the top nearly to the bottom of the nipple, and in Figs. 5 and 12 I show a nipple having two straight slots extending from the bottom only about half way up the nipple.

Figs. 6 and 13 show a nipple similar to that shown in Figs. 2 and 9 but without the pin $b'$.

In Figs. 7 and 14 the slot $b$ is shown extending the whole length of the nipple.

Figs. 8 and 15 show a nipple formed with a hexagonal head $b^2$ for the purpose of enabling the nipple to be held while the spoke is screwed thereinto.

I may make more than one slot in the nipple if required except when the slot extends completely through the nipple as shown in Figs. 7 and 14.

I often make the threaded end of the spoke with a saw-cut as shown at c in Fig. 16 so that if the spoke be broken off short the end can be extracted from the nipple without difficulty.

My improved method of attaching spokes to wheel hubs may be used for the wheels known as tangent wheels in which the spokes are tangential to the hub. The hubs of these wheels are provided with holes for the nipples the axes of which holes are not radial but make an angle with the radius.

The washers which I provide for securing the spokes to the rim according to the second part of my invention are shown in Figs. 17 to 19.

D is the rim, E the washer, and $c'$ the head of the spoke which is conical in shape as shown. The rim D is pierced with an orifice $d$ large enough to admit the head $c'$ of the spoke and is provided with a recess $d'$ into which the washer E fits. The washer is provided with a coned hole $e$ which fits the head of the spoke. In order to obviate the necessity for threading the spoke through the washer in which case the threaded portion of the spoke must be of smaller diameter than the hole in the washer, I either provide a slot $e'$ in the side of said washer as shown in Fig. 18 or I make the washer in two parts capable of being separated as shown in Fig. 19. When the spoke is introduced through the hole in the rim the washer is slipped on or the two parts of the washer placed in position round the head. Then when the spoke is pulled toward the hub the washer beds in the recess $d'$ in the rim, being thereby prevented from coming apart or letting the spoke detach itself through the slot.

My improved method of securing the heads of spokes to rims is not necessarily used in conjunction with the method described for securing spokes to hubs in the first part of this specification, as either method may be used independently.

My invention is applicable to both very light wheels as those for bicycles or the like and also to heavy wheels such as those for traps, cabs and other vehicles.

My improved washer can obviously be used with any form of wheel rim.

What I claim is—

1. In a suspension or tension wheel, the combination with a spoke of a slotted conical nipple adapted to be screwed on the ends of said spoke to connect the same with the wheel, substantially as, and for the purpose, specified.

2. In a suspension or tension wheel, the combination with a spoke, of a longitudinally slotted conical nipple adapted to be screwed on the end of said spoke, and a conical recess at the part where the spoke is connected to the wheel into which recess the nipple is drawn when the spoke is tightened, substantially as, and for the purposes, specified.

3. In a suspension or tension wheel, the combination of the hub, the spokes of the wheel, the rim, conical longitudinally slotted nipples adapted to be screwed on the ends of said spokes, conical recesses in the hub into which recesses the nipples are drawn when the spokes are tightened, split or slotted washers adapted to bed in recesses in the rim, and to engage the heads of the spokes, substantially as, and for the purpose, specified.

4. In a suspension or tension wheel the combination with the spokes, of longitudinally split or slotted conical nipples for connecting said spokes to the hub, and split or slotted washers for securing the heads of the spokes to the rim, substantially as, and for the purposes, specified.

In witness whereof I have hereunto set my hand this 8th day of January, 1894.

CHARLES KINGSTON WELCH.

Witnesses:
FREDERICK WILLIAM LE TALL.
THOMAS LAKE.